United States Patent [19]
Gleizes

[11] Patent Number: 6,015,498
[45] Date of Patent: Jan. 18, 2000

[54] COAL ASHES USED FOR TREATING VARIOUS MEDIA AND FACILITIES FOR USING SAME

[75] Inventor: Raymond M. Gleizes, 73 Les Mélèzes, 95680 Montlignon, France

[73] Assignees: Raymond M. Gleizes, Montlignon; Terrils, Lens, both of France

[21] Appl. No.: 08/930,109

[22] PCT Filed: May 13, 1996

[86] PCT No.: PCT/FR96/00722

§ 371 Date: Nov. 10, 1997

§ 102(e) Date: Nov. 10, 1997

[87] PCT Pub. No.: WO96/36434

PCT Pub. Date: Nov. 21, 1996

[30] Foreign Application Priority Data

May 19, 1995 [FR] France ................................ 95 05968
Feb. 14, 1996 [FR] France ................................ 96 01796

[51] Int. Cl.$^7$ .................................................. B01D 15/00
[52] U.S. Cl. ........................... 210/688; 134/7; 210/691; 210/143; 210/194; 210/241; 210/251; 425/62
[58] Field of Search .................................... 210/688, 691, 210/747, 770, 787, 143, 219, 153, 251, 241, 194; 134/7; 425/62

[56] References Cited

U.S. PATENT DOCUMENTS

| | | | |
|---|---|---|---|
| 4,226,630 | 10/1980 | Styron ........................................ | 106/85 |
| 4,472,198 | 9/1984 | Nowicki et al. .......................... | 106/85 |
| 4,530,765 | 7/1985 | Sabherwal ............................... | 210/688 |
| 4,981,600 | 1/1991 | Tobler et al. ............................ | 210/143 |
| 5,143,481 | 9/1992 | Schumacher et al. .................. | 405/129 |
| 5,292,442 | 3/1994 | Khan et al. .............................. | 210/770 |

FOREIGN PATENT DOCUMENTS 0 337 047  10/1989  European Pat. Off. .
60 99161   4/1994   Japan .

*Primary Examiner*—Ivars Cintins
*Attorney, Agent, or Firm*—Young & Thompson

[57] ABSTRACT

Ashes are used when they have the particle size of fly-ash, i.e., when they have just been produced by a combustion process. They can be used, inter alia, for dehydrating and/or stabilizing sewerage plant sludge or sludge from surface treatment plants, for detoxifying liquid, semi-liquid or solid media contaminated by heavy metals and the like, and for removing pollutants from hydrocarbon-containing liquid or semi-liquid media.

10 Claims, 3 Drawing Sheets

COAL ASHES USED FOR TREATING VARIOUS MEDIA AND FACILITIES FOR USING SAME

This application is a 371 of PCT/FR96/00722, filed May 13, 1996.

FIELD OF THE INVENTION

The present invention relates to the treatment of liquid, semiliquid or solid media and in particular of media containing heavy metals, which may be present in the form of hydroxides.

BACKGROUND OF THE INVENTION

For a number of years, the treatment of household and industrial wastes has been the subject of special attention on the part of research and industrial bodies, because of the ever increasing health and environmental requirements. Attempts have thus been made to improve, inter alia, the processes of treatment of sewage, including that of the residual sludge which they produce.

Insofar as the problem of the elimination of residual sludge is concerned, a conventional process consists in thickening them and then stabilizing them either by aerobic digestion or by anaerobic mineralization, so as to oxidize the organic matter which they contain. In subsequent stages they are either dehydrated or incinerated or dumped or reemployed, for example in agriculture.

Examples of residual sludge which may be mentioned are sludges from purification stations and industrial sludges, such as the sludge originating from surface treatment plants, especially from electroplating plants.

Until now, the stage of drying of the sludge produced by purification stations, which treat household sewage mixed with rainwater and, possibly, with industrial water, has been carried out chiefly with the aid of lime, which makes it possible to reach a dryness value of approximately 22 to 25% after passing through a settler and a filter, such as a filter press or a belt filter. However, this known process is found to be unsuitable for the new discharge standards in force, which require a dryness higher than 35% and an absence of leaching of the contaminant, in particular of heavy metals. In addition, this technique does not make it possible to combat the odours of this sludge, which can be a considerable nuisance for the surrounding populations. Similar problems arise with regard to the sludge originating from physicochemical treatments in surface treatment, for example electroplating, workshops. This sludge has, in fact, a dryness of the order of 5% on leaving the settler and subsequently not exceeding 20 to 22% after passing through filter presses.

There is therefore a need for a process which makes it possible to overcome the above-mentioned disadvantages of the prior art.

A solution has been proposed in European patent application No. 0 337 047 (reputed to be withdrawn) for detoxifying liquid and solid media by removing the heavy metals which they contain. This solution consists in employing an active adsorbent material produced by an oxidation of anamorphosed aluminosilicate particles originating from coal residues. The oxidation may be performed, for example, by roasting in air in a fluidized-bed furnace at a temperature which is described as being between 350 and 800° C. The active adsorbent material is prepared by granulation of the fly ash thus obtained, which initially has a particle size such that 34 to 45% of it has a diameter smaller than 100 $\mu$m. The granules are subsequently employed as a filter bed in a percolation column.

In practice, however, the process which is the subject matter of this prior patent application has been implemented by employing ash produced by combustion, at a temperature of the order of 1100°–1200° C., of coal residues, or more precisely of slag heaps. This is ash which has been marketed under the trademark Beringites, and which is, when the product is intended for water treatment, in the form of granules of a particle size of between 0.5 and 3 mm and, when the product is intended for the treatment of solid material, in the form of a powder, described as being fine, whereas the particle size is on average the following (particle size and corresponding weight percentage):

<100 $\mu$m: 30.2%
100–200 $\mu$m: 27.5%
200–500 $\mu$m: 38.9%
500–1000 $\mu$m: 3.1%
>1000 $\mu$m: 0.2%

Beringite®, which functions by adsorption and/or absorption, has been employed for the purpose of detoxification of media laden with heavy metals, with good results. However, the process for its utilization, involving a percolation, makes it necessary to employ large quantities of ash. In addition, it has not been envisaged to employ it to increase the dryness and/or the stability of sludge produced, for example, by sewage purification stations or produced by surface treatment workshops.

In addition, it has not been proposed to employ Beringite® for decontaminating liquid or semiliquid media laden with hydrocarbons, such as aqueous washes of soils soiled with polycyclic aromatic hydrocarbons, or PAHs. Until now these compounds have been removed by conventional physicochemical water treatment processes such as flocculation and flotation. The disadvantage of these known processes is that they make use of reactants which distort the results of measurement of the total hydrocarbons after treatment, results which it turns out to be necessary to obtain for a comparison with the standards in force. Furthermore, these processes do not make it possible to remove the heavy metals which the effluents being treated may also contain.

SUMMARY OF THE INVENTION

It has now been discovered that coal ash produced by burning in a boiler and which, in contrast to Beringite, is employed in the particle size state of fly ash, in which it is as a result of the burning, can at the same time give results that are advantageously modified quantitatively and/or qualitatively with regard to detoxification of liquid, semiliquid or solid media, and also make it possible to raise to the dryness required by the standards in force, as well as to stabilize, liquid or semiliquid media such as the sludge produced by sewage purification stations and surface treatment workshops.

A "semiliquid medium" is intended to mean any liquid medium containing a significant quantity of matter in suspension, and which could also be referred to as "semi-solid medium".

The expression "fly ash", refers to the ash which is recovered in the course of the removal of dust from the smoke emitted during burning in a boiler, in a dust remover of electrostatic or sleeve type.

This ash, in the particle size state in which it is at the end of the burning which has produced it, is not only much finer than the granules of the prior art, but it will also preferably be finer than that from which the granules originate. In fact, as is well known to a person skilled in the art, the particle size of the fly ash which can be recovered at the exit of a boiler depends on the boiler type (with a fluidized bed or using pulverized coal), on the coal or coal residues (containing more or less limestone) and on the dust remover which is employed. These parameters will be advantageously chosen so that the fly ash recovered should have a particle size such that at least 80% by weight passes through a screen with a mesh opening of 80 μm.

Without wishing to be bound by any theory, it is thought that the action of drying and of stabilization of the ash on the residual sludge is due to the considerable presence of calcium oxide in its composition, such as follows, for example, from Example 1 below. In practice it has been found that the ash makes it possible to reach dryness values recommended by the regulations, and even higher values, which provide the users of this ash with additional advantages. In fact, as a result of the more advanced drying, the volumetric quantity of material to be conveyed and subjected to the subsequent stabilization treatment is found to be greatly reduced, and this results in a corresponding saving. The standards relating to the mechanical robustness of the mixture of sludge and ash are also met. In addition, the leaching of the solid part consisting of the contaminant-laden ash is much lower than the standards. Finally, in most cases it has also been found that this ash makes it possible to reduce, or even to eliminate, the bad odours associated with this sludge.

The process of treatment according to the invention consists in subjecting the liquid, semiliquid or solid media to the action of the ash defined above, that is to say in the state of particle size of fly ash in which it is at the end of the burning, namely in the state of very fine powder, even when the medium to be treated is a liquid or semiliquid medium.

The process according to the invention can be applied to the decontamination of liquid or semiliquid media contaminated by hydrocarbons, to the detoxification of liquid, semiliquid or solid media such as soils laden with heavy metals, and to the dehydration and/or stabilization of sludge, without these applications being limiting.

When the process according to the invention is applied to the detoxification or decontamination of liquid or semiliquid media or to the dehydration and/or stabilization of semiliquid media, the treatment is implemented by ensuring an intimate contact between the medium to be treated and the ash (for example by stirring in a vessel). Advantageously, the medium to be treated and the ash are placed in contact for a period of the order of from 10 minutes to an hour, a period of the order of half an hour being in general appropriate to give optimal results. In addition the useful quantity of ash for obtaining optimum results generally varies between 0.2 and 2%. In practice, the contact time and the useful quantity of ash will be advantageously calculated beforehand, using analyses and laboratory tests on samples of the medium to be treated.

When it is a question of detoxifying soils which are contaminated, especially with heavy metals, the soils are mixed, by deep blending, with a percentage of ash corresponding to the quantities of heavy metals present in these soils. To do this, it is possible either to remove all of the soiled soil, in the case where it is intended to be dumped after treatment, or to perform an excavation on the site to be decontaminated—after having determined beforehand, by taking core samples, the extent of the excavation to be carried out—if the decontaminated soil is to be put back in place. In both cases no leaching will take place.

The invention is also aimed at plants for the continuous or sequential treatment, with the aid of the ash according to the invention, of a liquid or semiliquid medium which is possibly laden with heavy metals and/or with hydrocarbons.

In a first embodiment, which is aimed at a stationary plant, the plant includes adjustable flow-rate means ensuring the feeding of ash, adjustable flow-rate means ensuring the feeding of liquid or semiliquid medium to be treated, the feeding means feeding a stirring vessel suitable for feeding a settler provided with a removal of the liquid from the treated medium and with a separate removal of the ash to which the heavy metals and/or the hydrocarbons which the treated medium possibly contained have, where appropriate, been bound, the ash being mixed with the solid matter which the medium contained in suspension, means for recirculating in a closed circuit being provided to maintain an uninterrupted circulation in the stirring vessel, when the plant is in a standby state.

In a first alternative form the settler is a settling vessel provided, in a top part, with a discharge for the decanting supernatant formed by the liquid which the treated medium contained and, in a low part, with a discharge for the ash laden with contaminants and matter in suspension.

In a second alternative form, which is more sophisticated and which facilitates a total automation of the process, the settler is a centrifugal separator. This type of apparatus is well known on the market for liquid-solid separation. In the case where the treated medium consists of residual sludge the use of such a centrifugal separator is preferred, insofar as it makes it possible to obtain a sludge dryness which is higher, that is to say of the order of 60% than with a gravity settler.

It is to be clearly understood, however, that other types of means for solid-liquid separation could also be employed.

In a second embodiment the invention relates to a mobile plant for the treatment, with the aid of the ash according to the invention, of a liquid or semiliquid medium, advantageously of residual sludge. This plant includes, in combination:

means for storing ash, such as a silo, and for feeding ash and means for feeding liquid or semiliquid medium to be treated, a blender adapted to being fed by the means of feeding, a centrifugal separator adapted to being fed by the blender and provided with a removal of the liquid from the treated medium and with a separate removal of the ash to which the heavy metals and the hydrocarbons which the treated medium possibly contained have, where appropriate, been bound, the ash being mixed with the solid matter which the medium contained in suspension, means for automatic control of the above-mentioned feeding, blending, centrifuging and removal operations, and an electricity generating unit suitable for supplying the plant with energy.

The above-mentioned mobile plant will advantageously also include integral means for the analysis of the ash and of the liquid leaving the centrifugal separator. In addition, the plant can also include a device for moulding ash blocks, fed by the discharge of the ash from the centrifugal separator, so as to facilitate the subsequent handling and conveying of the discharged ash.

When it is employed in the treatment of residual sludge, this mobile plant has the advantage of being capable of treating relatively small quantities of sludge, such as that produced by surface treatment workshops, which would not justify the construction of a stationary plant. The same mobile plant can therefore treat the sludge from a number of surface treatment workshops on demand of their respective users. In other applications, for example in the treatment of aqueous washes of soils soiled with hydrocarbons, the mobility of the plant enables it, similarly, to be moved from one treatment site to another.

The examples below are given by way of guidance to demonstrate the properties of the ash according to the invention and, in particular, the quantitative and qualitative differences between the results of detoxification which are obtained on media laden with heavy metals, with the ash according to the invention and Beringite.

EXAMPLE 1

(general procedure)

Coal from mines in Provence (France), that is to say coal which is fairly lean, was burnt in a boiler with a circulating fluidized bed, operating at a mean temperature of the order of 830–850° C.

The ash obtained has a mean particle size as indicated above, that is to say that most of the particles are of a size smaller than 80 µm.

The ash obtained according to this example has a $SiO_2$ content of 22.00%, an $Al_2O_3$ content of 9.35%, a CaO content of 36.50%, an $Fe_2O_3$ content of 6.90% and a MgO content of 1.85%. It also contains 9.80% of free lime. These contents represent mean values.

BRIEF DESCRIPTION OF THE DRAWINGS

This ash is conveyed as it is towards the detoxification site, the process applied being described below with reference to the attached drawings, in which.

DETAILED DESCRIPTION OF THE INVENTION

Within the scope of the description of the figures, reference will be made, by way of example, to the application of the ash according to the invention to the detoxification of liquid or semiliquid media laden with heavy metals. It must, however, be quite clear that the plants described can alternatively, or additionally, be employed for treating media containing other contaminants, such as hydrocarbons, and for dehydrating and/or stabilizing residual sludge.

Figure 1:
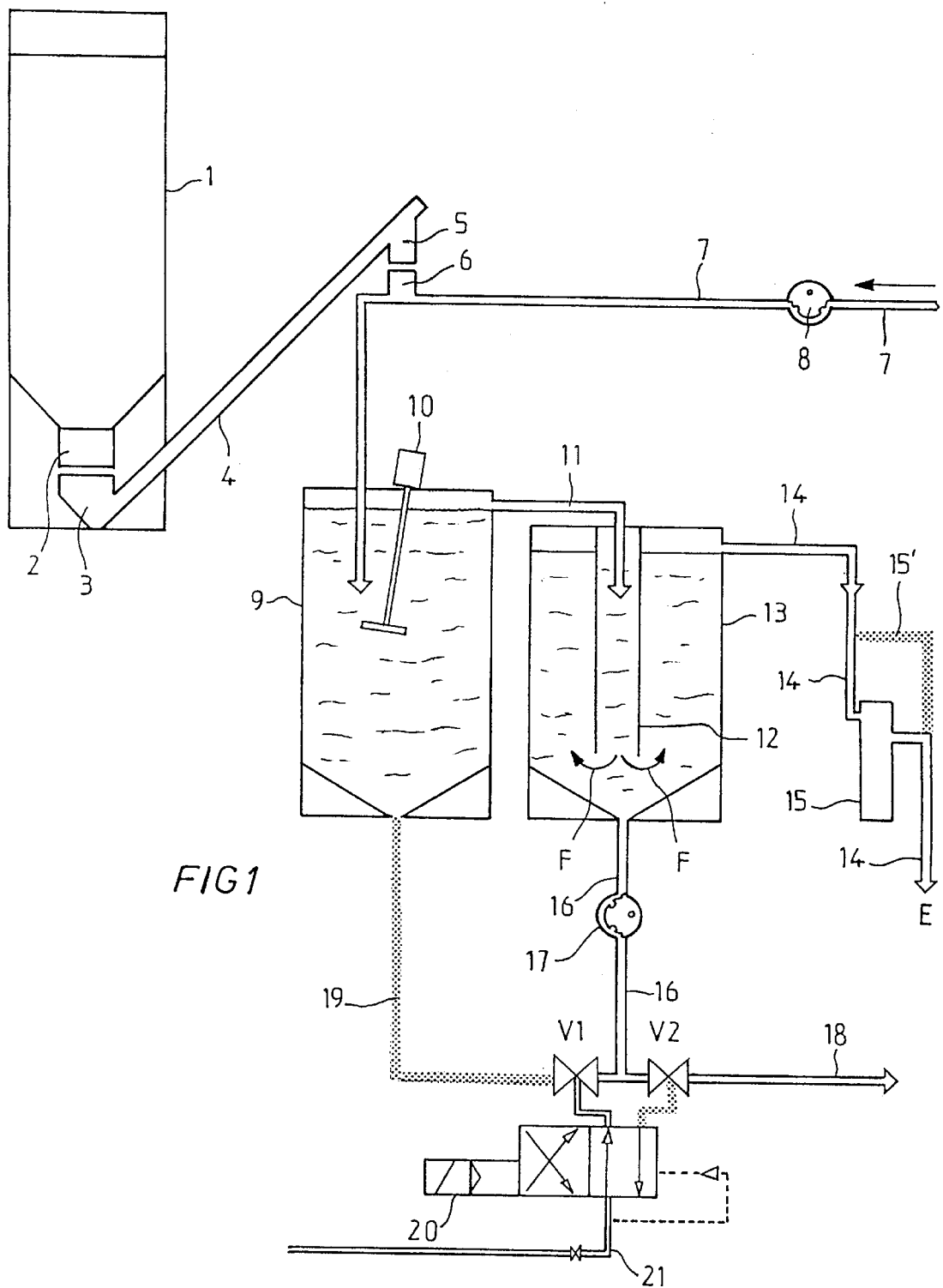
FIG. 1 illustrates a first form of embodiment of the plant according to the invention, in a first alternative form.

The plant illustrated diagrammatically in FIG. 1 comprises a silo 1 which, in a low part, opens into a rotary lock 2 spilling into the lower end 3 of a feed screw 4. The silo 1 is equipped with sequential vibrators and level probes which are not shown. The upper end 5 of the feed screw 4 feeds an ash injector 6 which opens into a conduit 7 for feeding liquid or semiliquid medium to be treated. A pump 8 is inserted into the conduit 7 upstream of the injector 6. Downstream of the injector 6 the conduit 7 dips into a stirring vessel 9 fitted with a stirrer 10. The vessel 9 comprises, in an upper part, an overflow which spills along 11 into the central part, bounded by a cylindrical partition 12, of a settling vessel 13. The partition 12, which acts as a siphon-shaped wall, ends at a certain distance from the bottom of the vessel 13 which is therefore not partitioned itself.

The volume of the two vessels 9 and 13 is calculated in order that (1) the contact between ash and liquid or semi-liquid medium to be treated in the vessel 9 and (2) the settling in the vessel 13 should last for the intended time, a time which is on average of the order of one half hour.

The vessel 13 comprises:

in an upper part an overflow which spills into a conduit 14 conducting the liquid of the treated medium to the drain E or to a recycle, a bag filter 15 being inserted in the conduit 14, and in a lower part, a conduit 16 for removal of ash in suspension in a fraction of the liquid or semiliquid medium.

A bypass 15' avoids the filter 15, when its throughput becomes insufficient, owing to being blocked.

The conduit 16 in which a pump 17 is inserted opens into a discharge conduit 18.

The plant in FIG. 1 additionally comprises equipment allowing it to keep running without stopping in the standby state. This involves, on the one hand, a pair of valves V1 and V2 which are inserted, the first one V1 being in a conduit 19 connecting the conduit 16 for removing the ash at the bottom of the stirring vessel 9, and the second, V2, inserted between the conduit 16 and the discharge conduit 18 and, on the other hand, a variable speed drive (not shown) actuating the pump 17 to vary its throughput according to the extraction (high speed) or standby (low speed) state.

The valves V1 and V2 are controlled by an electropneumatic unit 20 supplied with compressed air along 21. This control is exercised according to the following scheme:

in a running state (rotary lock 2, feed screw 4 and pump 8 in action; pump 17 operating at high speed): valve V1 closed, valve V2 open;

in standby state (rotary lock 2, feed screw 4 and pump 8 not in action; pump 17 operating at low speed): valve V1 open, valve V2 closed. When the plant of FIG. 1 is employed the treatment process is implemented as follows:

The ash as produced by burning is charged into the silo 1 and poured via the rotary lock 2 into the hopper which forms the lower end 3 of the feed screw 4. The flow rate of the ash which is distributed is adjusted, as a function of the nature and quantity of heavy metals present in the effluent to be treated, by means of a speed controller (not shown) with which the rotary lock 2 is equipped. The ash is thus hoisted to the upper end 5 of the screw 4 and poured into the injector 6. On another side, the medium to be treated, for example an effluent laden with heavy metals, is pumped by the pump 8 along the conduit 7 into which the ash injector 6 opens. The throughput of the pump 8 is adjusted as needed by a variable speed drive, not shown. The ash and the effluent come into contact in the conduit 7 at the injector 6 and the combination flows into the vessel 9, where it is stirred by the stirrer 10 for approximately one half hour. It will be noted, however, that, instead of coming into mutual contact upstream of the stirring vessel, the ash and the effluent could be introduced separately into the vessel. In this example the vessel has a volume of 5 $m^3$, the above-mentioned duration of half an hour and this above-mentioned volume of 5 $m^3$ corresponding to a pump 8 throughput of 5 $m^3$/h. As the ash/effluent mixture pours over into the vessel 9, a corresponding quantity of mixture escapes, along 11, via the overflow of the vessel 9, to be received in the central part, bounded by the partition 12, of the settling vessel 13, which also has a volume of 5 m³ and in which the ash/effluent suspension settles for one hour. As the stirred ash/effluent suspension pours over into the vessel 13, a corresponding quantity of the supernatant from settling escapes, along the arrows F, in the direction of the upper part of the vessel 13, while the settled ash is extracted by the pump 17 via the conduit 16. As the supernatant rises in the peripheral part of the vessel 11, the settling becomes complete and, when it reaches the overflow of the vessel 13, the supernatant consists substantially only of effluent which is detoxified, that is to say containing a quantity of heavy metals which is much lower than the permissible threshold according to the international standards in force. It is removed via the conduit 14, the inserted filter 15 retaining the dust which is unaffected by the settling. The conduit 14 is connected to the drain E or to a recycling plant.

For its part, the ash laden with contaminants is conveyed, along 18, towards a dehydration unit. The resulting dry material can, for example, be employed in cement manufacture.

Figure 2:
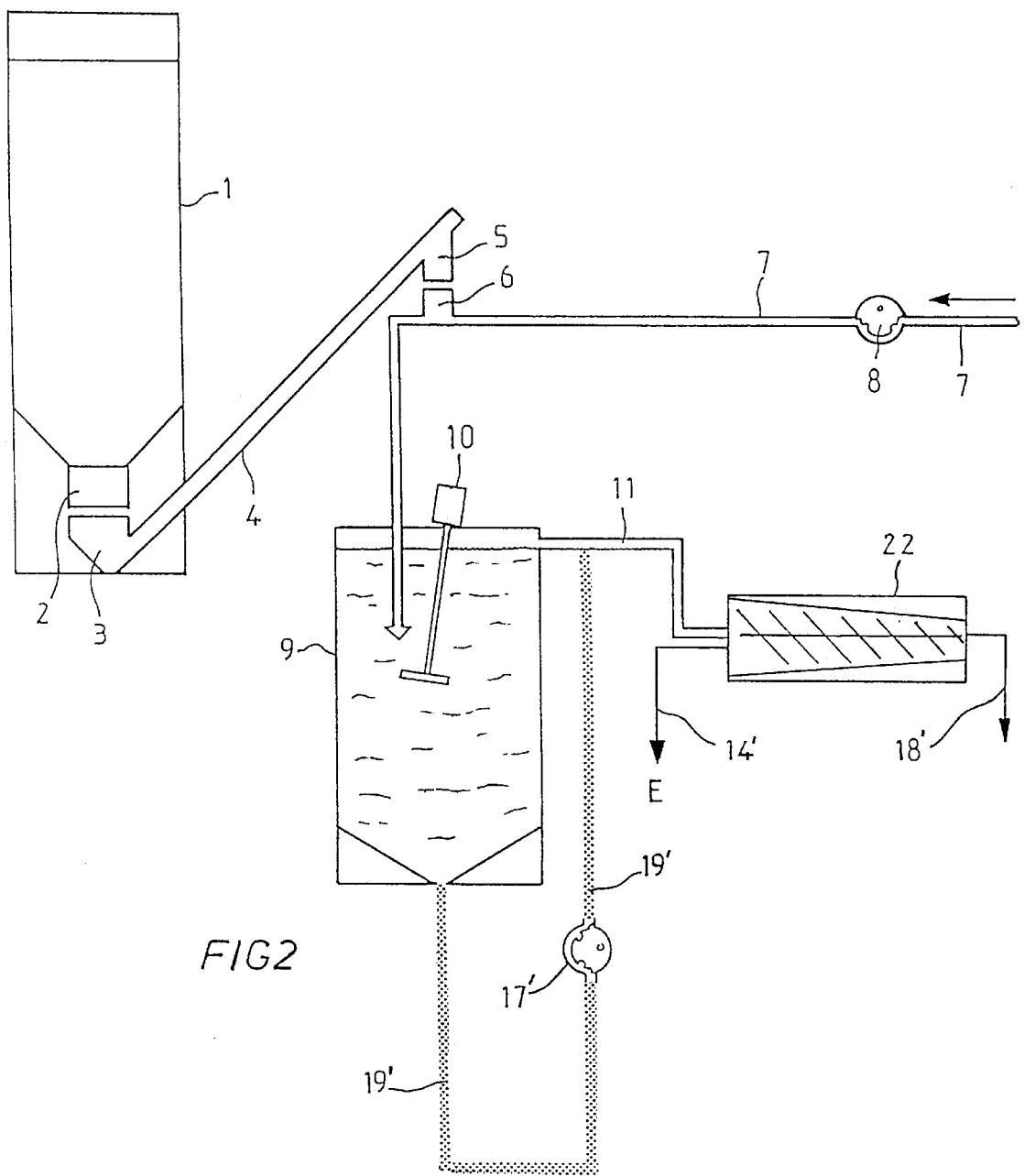
FIG. 2 illustrates a second alternative form of the first form of embodiment of the plant according to the invention.
Figure 3:
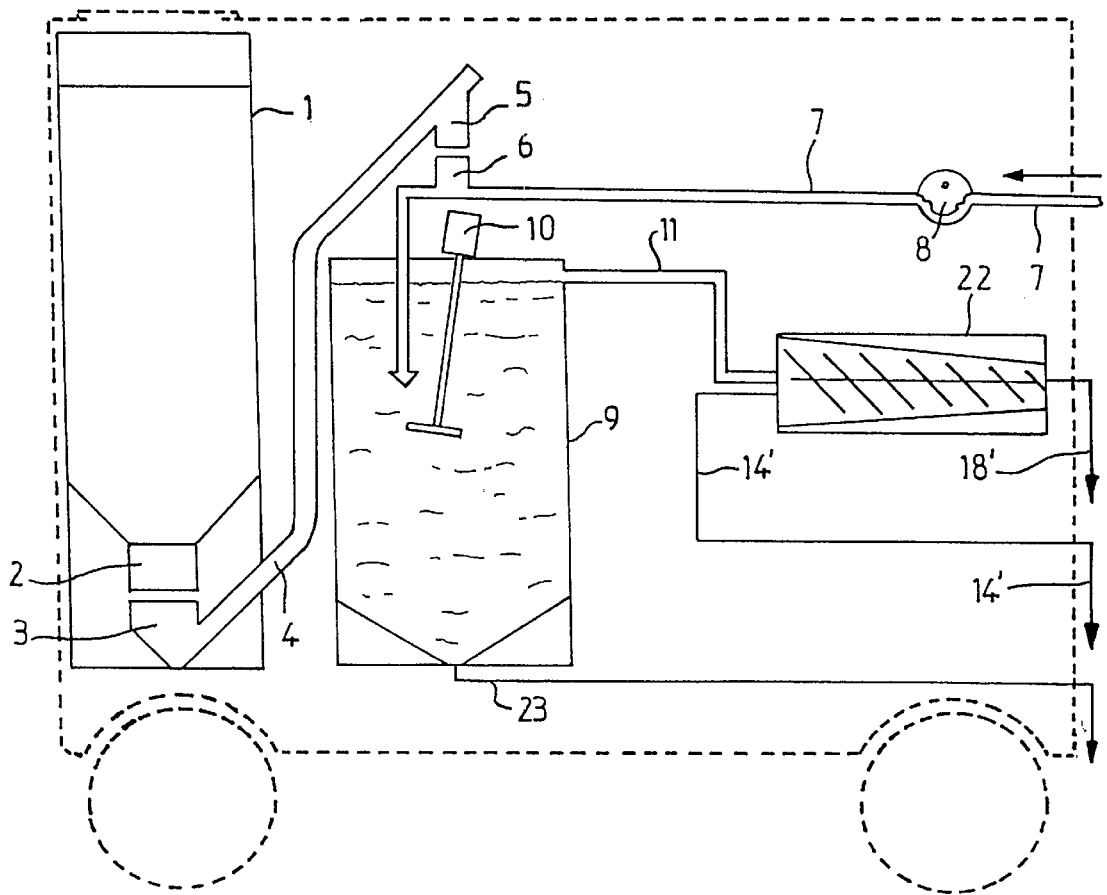
FIG. 3 illustrates a second form of embodiment of the plant according to the invention.

The components of the plants in FIGS. 2 and 3 which are in common with those of the plant in FIG. 1 are denoted by the same references and will not be described again, nor will their operation. The components of the plants of FIGS. 2 and 3 which are similar to components of the plant in FIG. 1 are denoted by the same references, but followed by a prime mark.

The plant in FIG. 2 differs from that of FIG. 1 in being considerably simplified, by virtue of the use of the centrifugal separator, shown very diagrammatically at 22, instead of a settling vessel functioning by gravity.

More precisely, the centrifugal separator 22 is made up of a conical cylindrical bowl in which a coaxial conveyor screw is housed. This type of centrifugal separator operates by differential speed between the bowl and the screw and separately removes, along 18', the ash laden with heavy metals and mixed with the solid matter which the effluent to be treated contained and, along 14', the effluent rid of the heavy metals. A conduit 19' forms a bypass between the conduit 11, upstream of the centrifugal separator 22, and the low part of the stirring vessel 9. A pump 17' is inserted in the conduit 19'. In an extraction state the pump 17' is not in action. In a standby state, it ensures the continuous circulation of the mixture of ash and effluents in the stirring vessel.

The plant of FIG. 3, for its part, differs from that of FIG. 2 in being designed to be mounted on a trailer. As a result, the silo 1 and the hopper 3 associated with the latter are lowered, in relation to FIG. 2, by a distance such that the bottom of the silo 1 and the bottom of the blender 9 are substantially at the same level on the trailer (which is very roughly outlined by broken lines). In addition, this plant does not comprise any bypass conduit 19' (FIG. 2) between the conduit 11, upstream of the centrifugal separator 22, and the blender 9. Instead, the low part of the blender 9 has a discharge point 23 allowing it to be drained. The plant additionally includes means for automatic control of the feed operations, of blending, of centrifuging and of discharging, and an electricity generator unit suitable for supplying energy to the plant, which means of control and electricity generator unit have not been shown, so as not to overload the figure.

EXAMPLE 2

Determination of the effect of the duration of contact between the ash and the treated medium.

Three solutions (I, II and III) were treated, the metallic element content of which is shown in Table I and which were kept in contact with the ash according to the invention for 15, 30, 45, 60, 90 and 120 minutes.

As emerges from this Table, the metallic element content of the medium, after treatment:

reaches its minimum value after 30 min, with regard to Cd, Cu and Fe (solution I) and Pb (solution II), offers the steepest gradient of reduction over 30 min with regard to Cr (solution I), decreases rapidly over 15 min and then progressively from then on with regard to Pb (solution I) and Zn (solutions I and II).

Bearing in mind the results observed, a treatment period of 30 min will be generally optimal.

As also emerges from Table I, a rapid rise in the pH of the medium is observed, which changes from a clearly acidic value at the beginning to a clearly basic value over 15 minutes and stays there.

EXAMPLE 3

Determination of the effect of the ash quantity employed.

An effluent, the metal element content of which is shown in Table II, was treated with the ash according to the invention, which was added to the effluent in a quantity of 0.2% and 2% by volume respectively, the ash and the effluent having been kept in mutual contact for approximately 30 minutes.

As emerges from this table, the metal element content of the medium, after treatment, is substantially the same in both cases, that is to say much lower than the standards in force.

It will also be noted that the initial, too acidic, pH of the medium was adjusted to 5.4 before treatment, so as to permit the precipitation of the copper in hydroxide form.

EXAMPLE 4

Quantitative and qualitative comparison of the detoxification of a chromic bath using the ash according to the invention and the ash according to the prior art as control.

A chromic bath, the metal content of which is shown in Table III below, was treated for 30 minutes with 2% by volume of ash according to the invention, the plant described above being employed. The same bath was furthermore treated with the ash of the prior art, by making use of a percolation process employing at least 10% by volume of ash.

As emerges obviously from this Table, the effectiveness of the ash according to the invention applies to all the elements and is quantitatively superior to that of the control ash with regard to each of them, the control ash having little or no effect on the content of As, of total Cr and of Ni of the initial chromic bath, and even increasing its content of Cd and of Zn, and possibly of total Cr.

EXAMPLE 5

Quantitative and qualitative comparison of the detoxification of a cyanide-containing bath using the ash according to the invention and the ash according to the prior art as control.

A cyanide-containing bath whose metal content is shown in Table IV below was treated respectively with the ash according to the invention and the control ash, as described in Example 4. As emerges obviously from this Table, the effectiveness of the ash according to the invention applies to all the elements and is quantitatively superior to that of the control ash with regard to each of them, except in the case of Fe, where it is of the same order.

EXAMPLE 6

Treatment of effluents contaminated with PAHs.

In parallel with the study of detoxification, described above, the effectiveness of the ash according to the invention was evaluated in the detoxification of aqueous effluents produced by washing soil soiled with polycyclic aromatic hydrocarbons. The quantity of ash employed represented approximately 5% of the volume of the effluent to be treated and the contact time between the ash and the effluent was approximately 30 minutes. The results obtained are collated in Table V below. As this table shows, the ash according to the invention makes it possible to obtain an overall degree of decontamination of 96.4%. The total hydrocarbon content after treatment is 10.4 μg/kg, that is 1.04 mg/l, which is much lower than the standards in force, which restrict the discharge of hydrocarbons to 5 mg/l. Once treated, the effluent can therefore be discharged or, if desired, recycled (for example reemployed in the context of new washing of soils).

EXAMPLE 7

Leaching test.

A leaching test, according to the standard X31-210 was performed on ash according to the invention which had been used for the treatment of a chromium containing effluent produced by an electroplating plant.

The results of this test are collated in Table VI. As emerges from this table, the contents of leached metallic elements are all much lower than the standards.

EXAMPLE 8

Treatment of purification station sludge.

A stabilization test was carried out on sludge produced by the water purification station in Millau, Aveyron (France), to which three types of ash according to the invention were added separately, identified by references 1, 2 and 3 respectively, which contain increasing CaO contents and which have a decreasing particle size. Ash of each type was added in a quantity of 1 and 2% by volume respectively. The contact time between the ash and the sludge was approximately 30 minutes.

The results of this test are given in Table VII below.

As emerges from this table, the addition of ash according to the invention to the sludge makes it possible, in all cases, to reach a dryness value, calculated according to the standard X31-102, higher than 60% and even capable of ranging up to 70%, that is much higher than the standards in force, which recommend a dryness value of at least 35%. It will be noted that the results obtained depend more on the CaO content and/or on the particle size of the ash employed than on the quantity of ash used.

The solid part stabilized in this way can be stored. Leaching tests and analyses of the supernatant waters have given results similar to those obtained in the preceding examples, that is to say values which are much lower than the standards.

From the preceding examples it emerges that the ash according to the invention constitutes a means of detoxification and of decontamination with better performance than the ash of the prior art. Here again, without wishing to be bound by any theory, it is thought that the particles of the ash according to the invention have a physicochemical structure which differs from the ash employed previously in detoxification applications, since they have a much finer particle size.

The ash according to the invention can be employed not only for ridding liquid and semiliquid media of their heavy metals and of their hydrocarbons, definitively immobilizing these contaminants, as described in the examples, but also for decontaminating solid media containing heavy metals. Bearing in mind the absence of leaching, the ash according to the invention can be employed for blocking these contaminants and thus prohibiting them, for example, from preventing the development of biological processes such as plant growth.

In addition, as already seen, the ash according to the invention can, alternatively or additionally, be employed for dehydrating and/or stabilizing residual sludge, such as the sludge originating from surface treatment plants or purification stations.

Lastly, being capable of direct application, that is to say without any preliminary agglomeration into granules, the ash according to the invention is much more economical in use than that of the prior art.

It is quite obvious that the invention is not limited to the methods of implementing the process and forms of embodiment of the plant which have been described.

TABLE I

| | Content of elements in the solution in mg/l Solution/ash contact period | | | | |
|---|---|---|---|---|---|
| Element | 0 min | 15 min | 30 min | 45 min | 60 min |
| (I) | | | | | |
| Cd | 20.0 | 0.144 | <0.005 | <0.005 | <0.005 |
| Cr | 28.7 | 0.227 | 0.085 | 0.087 | 0.079 |
| Cu | 27.3 | 0.219 | <0.005 | <0.005 | <0.005 |
| Fe | 28.1 | 0.143 | <0.005 | <0.005 | <0.005 |
| Pb | 12.1 | 1.51 | 1.58 | 0.972 | 0.602 |
| Zn | 30.7 | 4.14 | 3.27 | 1.52 | 0.831 |
| pH | 4.32 | 12.61 | 12.63 | 12.61 | 12.63 |
| (II) | | | | | |
| Pb | 9.68 | 0.009 | 0.009 | 0.009 | 0.010 |
| Zn | 23.9 | 0.255 | 0.135 | 0.064 | 0.074 |
| Ni | 23.8 | 0.117 | <0.005 | <0.005 | 0.011 |
| pH | 4.46 | 12.38 | 12.46 | 12.29 | 12.30 |
| (III) | | | | | |
| As | 0.55 | <0.005 | <0.005 | | <0.005 |
| pH | 4.12 | | 12.73 | | 12.69 |

TABLE II

| | Content of elements in the effluent, in mg/l | | |
|---|---|---|---|
| | | After treatment with the ash according to the invention | |
| | Before | | |
| Element | Treatment | 2% | 0.2% |
| Al | 4.14 | 0.29 | 0.23 |
| Cd | 0.02 | <0.01 | <0.01 |
| Total Cr | 3.34 | 0.08 | 0.05 |
| Cu | 112.5 | 0.34 | 0.72 |
| Sn | 15.4 | 0.001 | <0.001 |
| Ni | 66.5 | 0.25 | 0.39 |
| Zn | 5.84 | 0.06 | 0.05 |
| Pb | 2.36 | 0.08 | 0.11 |
| Fe | 162 | 0.48 | 0.17 |
| As | <0.001 | <0.001 | <0.001 |
| Hg | <0.001 | <0.001 | <0.001 |

TABLE II-continued

Content of elements in the effluent, in mg/l

| | | After treatment with the ash according to the invention | |
|---|---|---|---|
| Element | Before Treatment | 2% | 0.2% |
| pH | 0.62 | 10.2 | 9.2 |

TABLE III

Content of elements in the chromic bath, in mg/l

| | | After treatment | |
|---|---|---|---|
| Element | Before treatment | Ash according to the invention | Control ash |
| As | <0.005 | ND | <0.005 |
| Cd | 2.9 | <0.005 | 4.1–6.1 |
| Total Cr | 6.6 | 0.4 | 6.4–9.6 |
| Cu | 0.6 | ND | 0.25–0.35 |
| Fe | 23.0 | <0.005 | 1.1–1.17 |
| Pb | 0.03 | ND | 0.02 |
| Zn | 1.05 | <0.005 | 3.2–4.8 |
| Ni | 3.6 | 0.14 | 2.6–3.8 |
| Al | 0.04 | ND | <0.005 |
| Sn | <0.01 | ND | NM |
| pH | 2.20 | 12.46 | NM |

ND: not detectable
<0.005: lower than 0.005 mg/l but detectable
NM: not measured

TABLE IV

Content of elements in the cyanide bath, in mg/l

| | | After treatment | |
|---|---|---|---|
| Element | Before treatment | Ash according to the invention | Control ash |
| As | 0.013 | ND | <0.005 |
| Cd | 24.1 | 0.002 | 0.04–0.06 |
| Total Cr | 0.33 | ND | 0.04–0.06 |
| Cu | 220 | 0.23 | 4.2–6.2 |
| Fe | 9.1 | 0.045 | 0.03–0.05 |
| Pb | 0.51 | ND | 0.02–0.03 |
| Zn | 112 | 0.09 | 0.3–0.5 |
| Ni | 48.2 | 0.06 | 0.06–0.10 |
| Al | 16.1 | 0.08 | <0.005 |
| Sn | 2.2 | <0.005 | NM |
| pH | 12.13 | 12.46 | NM |

ND: not detectable
<0.005: lower than 0.005 mg/l but detectable
NM: not measured

TABLE V

PAH content

| | Before treatment (μg/kg) | After treatment (μg/kg) | Degree of decontamination (%) |
|---|---|---|---|
| Naphtalene | 73.7 | 4.23 | 94.3 |
| Acenaphtalene | 18.6 | <0.01 | 99.9 |
| Fluorine | 55 | 1.35 | 97.5 |
| Phenanthrene | 48.2 | 2.41 | 95 |
| Anthracene | 35.4 | 1.24 | 96.5 |
| Pyrene | 8.6 | <0.01 | 99.9 |
| Chrysene | 23.1 | <0.01 | 99.9 |
| Benzo-k-fluoranthrene | 9.84 | 0.45 | 95.4 |
| Benzo-a-pyrene | 14.93 | 0.72 | 95.2 |
| Totals | 287.37 | 10.4 | 96.4 |

TABLE VI

Content of metallic elements (mg/l)

| Element | 1st leachate | 2nd leachate | 3rd leachate | Total quantity extracted (mg/kg) |
|---|---|---|---|---|
| Chromium | 0.142 | 0.007 | 0.007 | 1.56 |
| Chromium (VI) | <0.02 | <0.02 | — | <0. |
| Manganese | <0.005 | <0.005 | <0.005 | <0.15 |
| Iron | <0.005 | <0.005 | <0.005 | <0.15 |
| Cobalt | <0.005 | <0.005 | <0.005 | <0.15 |
| Nickel | 0.613 | 0.022 | 0.017 | 6.52 |
| Copper | <0.005 | <0.005 | <0.005 | <0.15 |
| Zinc | 0.019 | 0.037 | <0.005 | 0.61 |
| Cadmium | 0.017 | <0.005 | <0.005 | 0.27 |
| Lead | <0.010 | <0.010 | <0.010 | <0.3 |
| Aluminum | 0.241 | 0.114 | 0.21 | 5.65 |
| Mercury | <0.0002 | <0.0002 | <0.0002 | <0.006 |
| Bromide | 2.2 | 0.6 | <0.1 | 29 |
| Arsenic | 0.007 | 0.005 | 0.006 | 0.18 |
| Tin | <0.005 | <0.005 | <0.005 | <0.15 |
| Total cyanides | <0.005 | <0.005 | <0.005 | <0.15 |
| Free cyanides | <0.005 | <0.005 | <0.005 | <0.15 |

TABLE VII

Ash employed

| Type | Quantity (vol. %) | Dryness value (%) |
|---|---|---|
| 1 | 2% | 60.5 |
| | 2% | 64.5 |
| 2 | 1% | 64.5 |
| | 1% | 65.6 |
| 3 | 2% | 70.8 |
| | 1% | 70.0 |

What is claimed is:

1. Process for the treatment of a liquid or semiliquid medium, which comprises:

contacting the medium to be treated with from 0.2 to 2% by weight, relative to the volume of the medium to be treated, of coal fly ash produced by burning in a boiler with a circulating fluidized bed, at a temperature of about 850° C., said ash having a particle size such that at least 80% by weight passes through a screen having a mesh opening of 80 μm.

2. Process according to claim 1, wherein the medium contains a toxic constituent selected from the group consisting of heavy metals, polycyclic aromatic hydrocarbons, and mixtures thereof.

3. Process according to claim 1, further comprising after treatment of the medium with said ash, centrifuging the treated medium to separately recover the liquid of the treated medium and the ash, said ash being mixed with solid matter which was suspended in the medium.

4. Process according to claim 1, wherein the medium to be treated and the ash are contacted for a period of between ten minutes and an hour.

5. Process according to claim 1, wherein the medium to be treated and the ash are contacted for a period of about half an hour.

6. Process according to claim 1, wherein the medium treated comprises sludge from purification stations or sludge produced by surface treatment workshops, and said sludge is dehydrated or stabilized by contact with the ash.

7. Process for the detoxification of soils contaminated with heavy metals, which comprises:

mixing the contaminated soils with coal fly ash in an amount sufficient to detoxify the soils, said ash being produced by burning in a boiler with a circulating fluidized bed, at a temperature of about 850° C., said ash having a particle size such that at least 80% by weight passes through a screen having a mesh opening of 80 μm.

8. Plant for the treatment of liquid or semiliquid media, which comprises:

a stirring vessel having an outlet;

first adjustable flow-rate means fluidly connected to a source of coal fly ash for feeding coal fly ash to said stirring vessel, said ash produced by burning in a boiler with a circulating fluidized bed at a temperature of about 850° C., said ash having a particle size such that at least 80% by weight passes through a screen having a mesh opening of 80 μm;

second adjustable flow-rate means for feeding the liquid or semiliquid medium to said stirring vessel;

a centrifugal separator having an inlet fluidly connected to the outlet of said stirring vessel, a discharge conduit for separated liquid, and a discharge outlet for ash removal; and closed circuit recirculation means operatively associated with said stirring vessel for maintaining uninterrupted circulation in said stirring vessel when the plant is in a standby state.

9. Mobile plant for the treatment of liquid or semiliquid media, which comprises:

means for storing coal fly ash produced by burning in a boiler with a circulating fluidized bed at a temperature of about 850° C., said ash having a particle size such that at least 80% by weight passes through a screen having a mesh opening of 80 μm;

means for supplying ash;

means for feeding liquid or semiliquid medium to be treated;

a blender structured and arranged to be fed by the supplying means and the feeding means;

a centrifugal separator fluidly connected to the blender and having a first outlet for removing separated liquid of the treated medium, and a second outlet for removing separated ash;

means for automatically controlling the supplying, feeding, blending, centrifuging and removal operations;

an electricity generating unit for supplying said plant with electrical energy; and wherein the plant is mounted on a trailer.

10. Plant according to claim 9, further comprising a device for molding ash blocks fed by the second outlet.

* * * * *